United States Patent
Haidar et al.

(10) Patent No.: US 8,480,119 B2
(45) Date of Patent: Jul. 9, 2013

(54) OCCUPANT PROTECTION AIRBAG FOR A VEHICLE

(75) Inventors: Raf Haidar, Coventry (GB); Timothy Scott, Benfleet (GB); Johannes A Varcus, Sprockhovel (DE)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 13/094,224

(22) Filed: Apr. 26, 2011

(65) Prior Publication Data
US 2011/0260437 A1    Oct. 27, 2011

(30) Foreign Application Priority Data

Apr. 27, 2010 (DE) .......................... 10 2010 028 268

(51) Int. Cl.
*B60R 21/217* (2011.01)
(52) U.S. Cl.
USPC .................................... 280/728.2; 280/728.1
(58) Field of Classification Search
USPC ................ 280/736, 728.2, 728.1, 730.2, 732, 280/731, 730.1
See application file for complete search history.

(56) References Cited

U.S. PATENT DOCUMENTS

| | | | | |
|---|---|---|---|---|
| 4,332,398 A | * | 6/1982 | Smith | 280/732 |
| 5,647,608 A | * | 7/1997 | Damman et al. | 280/728.2 |
| 5,799,970 A | * | 9/1998 | Enders | 280/730.2 |
| 5,806,879 A | * | 9/1998 | Hamada et al. | 280/728.2 |
| 6,164,685 A | | 12/2000 | Fischer et al. | |
| 6,817,627 B2 | * | 11/2004 | Galmiche et al. | 280/730.1 |
| 6,991,253 B2 | * | 1/2006 | Webber | 280/728.3 |
| 7,338,069 B2 | * | 3/2008 | Breed | 280/729 |
| 7,380,813 B2 | | 6/2008 | Lanzinger et al. | |
| 2003/0230873 A1 | | 12/2003 | Bayer | |
| 2007/0018440 A1 | * | 1/2007 | Reiter et al. | 280/732 |

FOREIGN PATENT DOCUMENTS

| | | | |
|---|---|---|---|
| DE | 102006056864 | * | 6/2008 |
| WO | 03045738 A1 | | 6/2003 |

* cited by examiner

*Primary Examiner* — Faye M Fleming
*Assistant Examiner* — Keith Frisby
(74) *Attorney, Agent, or Firm* — Frank A. MacKenzie; Brooks Kushman P.C.

(57) ABSTRACT

An occupant protection airbag device for a vehicle includes a housing having an opening and a closed end, a strut secured to the housing adjacent the closed end and extending from the closed end toward the opening, and an inflator supported by the strut adjacent the opening and spaced from the closed end to form a storage chamber between the inflator and the closed end of the housing. The inflator is spaced from an inner wall of the housing to form a gap therebetween. An airbag is stored in a deflated condition between the inflator and the closed end of the housing, and a forward-most layer of the airbag passes through the gap and around a surface of the inflator immediately adjacent the opening.

20 Claims, 3 Drawing Sheets

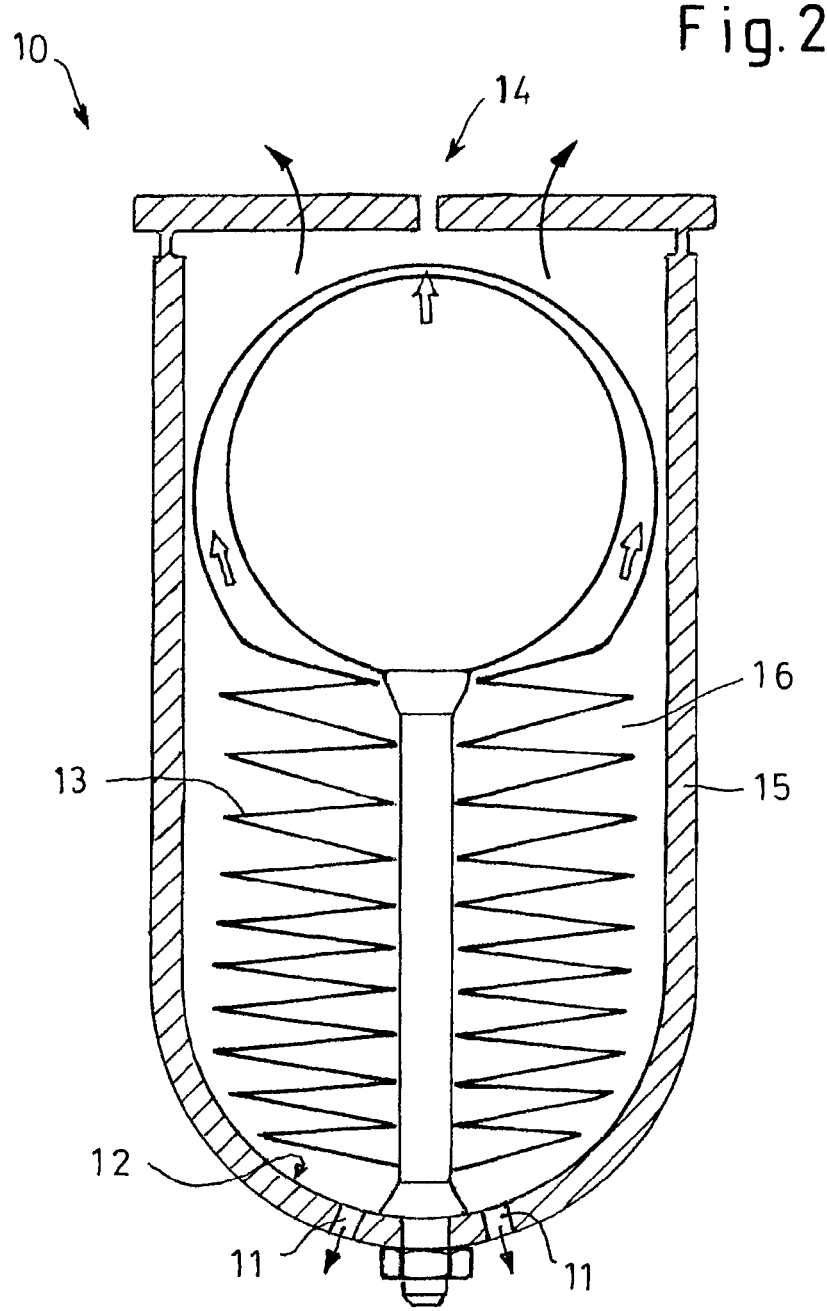

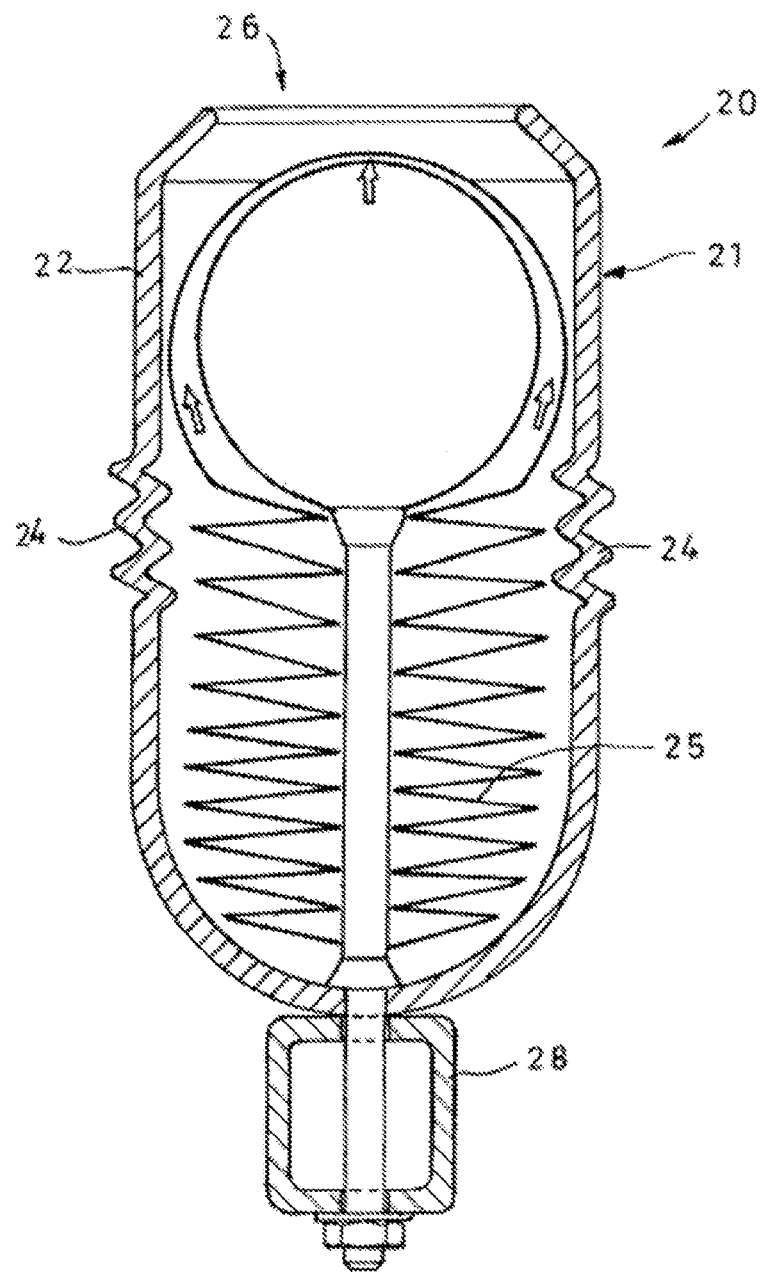

OCCUPANT PROTECTION AIRBAG FOR A VEHICLE

CROSS-REFERENCE TO RELATED APPLICATIONS

This application claims foreign priority benefits under 35 U.S.C. 119(a)-(d) to DE 10 2010 028 268.5, filed Apr. 27, 2010, which is hereby incorporated by reference in its entirety.

TECHNICAL FIELD

The invention relates to an occupant protection airbag for a vehicle.

BACKGROUND

In motor vehicles, for protecting the occupants an airbag arranged in an airbag module is generally arranged behind an interior trim of the instrument panel provided with a decorative layer. In the event of a collision, an inflator which is also arranged in the airbag module is then activated, whereby the airbag is rapidly inflated. By the expansion of the volume of the airbag associated therewith, the interior trim is opened.

In the prior art, various configurations are known for an occupant safety device having an inflator, an airbag, and a housing which contains the inflator and airbag prior to the airbag being deployed. Among the patent publications which disclose such occupant safety devices are: U.S. Pat. Nos. 6,164,685; EP 1 448 411 B1; US 2003/0230873 A1, and U.S. Pat. No. 7,380,813 B2.

SUMMARY

An occupant protection device for a vehicle comprises an airbag housing having an opening adjacent a first end and an opposite closed end, a strut extending from the closed end toward the opening, an inflator supported by the strut and located adjacent the opening, and an airbag stored in a deflated condition such that a majority of the airbag is stored between the inflator and the closed end of the housing. A layer of the airbag passes over a front surface of the inflator facing the opening. When the inflator is activated to inflate the airbag, the airbag layer covering the front surface of the inflator is urged through the opening and the rest of the airbag is pulled through the gap between the inflator and the inner surface of the housing adjacent the inflator.

In another disclosed embodiment, an occupant protection device for a vehicle comprises a housing having an opening and a closed end, a strut secured to the housing adjacent the closed end and extending from the closed end toward the opening, an inflator supported by the strut adjacent the opening and spaced from the closed end to form a storage chamber between the inflator and the closed end of the housing, the inflator spaced from an inner wall of the housing to form a gap therebetween, and an airbag that, when in a deflated condition, is disposed primarily in the storage chamber. The airbag passes through the gap and around a surface of the inflator immediately adjacent the opening.

In another disclosed embodiment, an occupant protection device for a vehicle comprises a housing defining an interior chamber and having an opening, a strut secured to a closed end of the housing opposite the opening and extending toward the opening, an inflator supported by the strut within the chamber and adjacent the opening, the inflator spaced from an inner wall of the housing to form an annular gap therebetween, and an airbag that, when in a deflated condition, is stored in the chamber between the inflator and the closed end of the housing. A layer of the airbag passes through the annular gap and over a surface of the inflator immediately adjacent the opening.

BRIEF DESCRIPTION OF THE DRAWINGS

Further details, features and advantages of the invention are revealed from the following description of exemplary embodiments with reference to the drawings, in which:

FIG. 2 shows a section through a schematic side view of a second embodiment of an occupant protection device and FIG. 3 shows a section through a schematic side view of a third embodiment of an occupant protection device.

DETAILED DESCRIPTION

Figure 1:
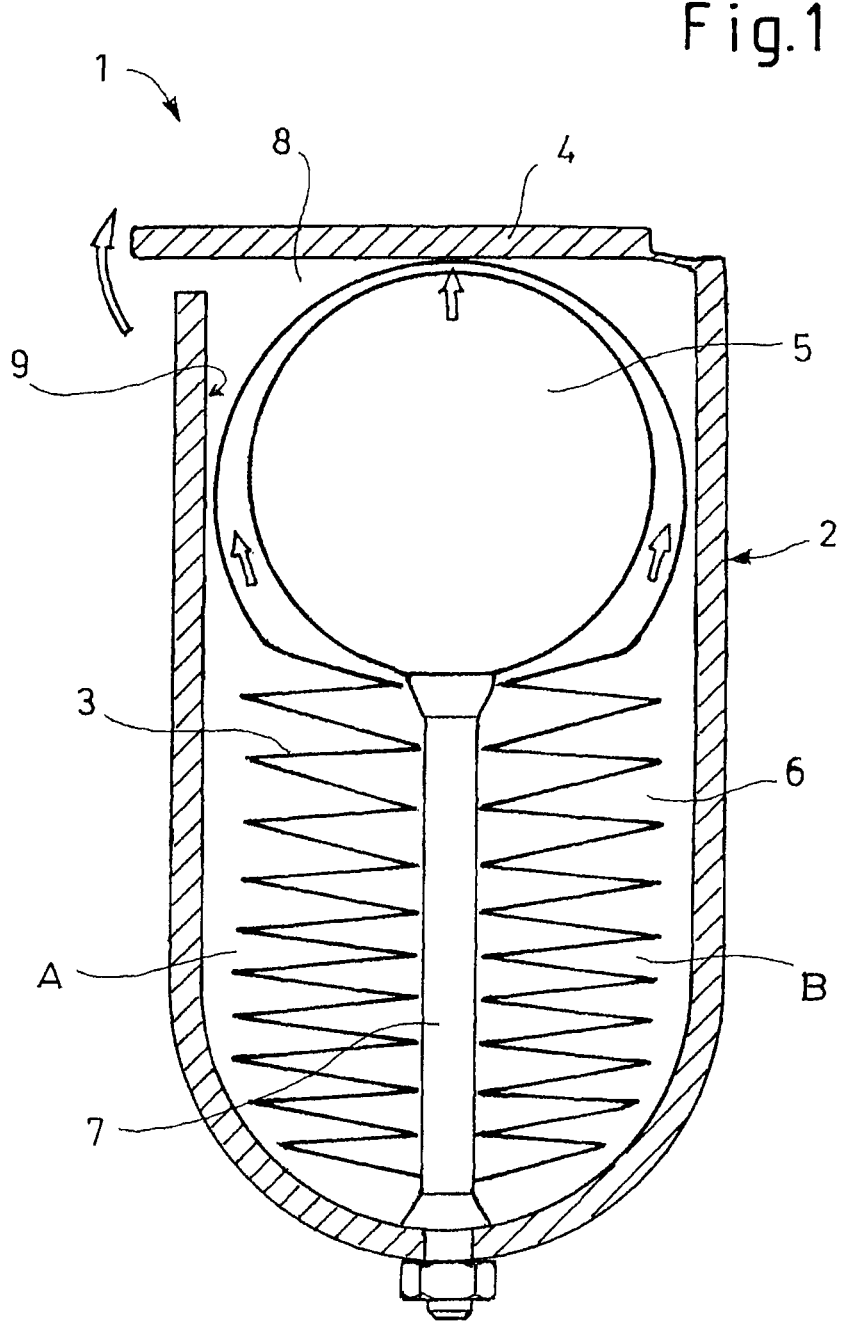
FIG. 1 shows a section through a schematic side view of an occupant protection device.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The basic construction of the occupant protection device 1 will be explained hereinafter with reference to the embodiment of FIG. 1. The further embodiments of FIGS. 2 and 3 have, in principle, the same construction, so that within the context of the description thereof details are only provided about the differences.

The occupant protection device 1 for a vehicle of FIG. 1 consists of an airbag housing 2 which is of elongated, U-shaped section, an inflatable airbag 3 and a cover 4 for the airbag housing 2 to be opened by the airbag 3 when triggered, as well as an inflator 5 for inflating the airbag 3. Preferably, the airbag housing has an elongated U-shaped section.

The cover 4 covers the storage chamber 6 for the airbag 3 formed in the airbag housing 2 toward the vehicle interior, i.e. it is generally formed as part of the internal trim of the vehicle, and the inflator 5 which is approximately circular in section is arranged in the airbag housing 2 in the vicinity of the cover 4, supported by a raised portion or strut 7. In a preferred embodiment, only the front-most layer 8 of the airbag 3 (that is, the layer closest to the housing opening and which will be the first to deploy through the opening) is arranged between the cover 4 and the inflator 5. This layer 8 extends over/around the inflator 5 so that when inflated by the inflator 5 only the one layer 8 has to be forced out of the airbag housing 2 in the direction of the arrows shown. Strut 7 may comprise a bolt which may also be used for fastening the airbag housing to the bodywork of the vehicle.

The inflator 5 and the airbag housing 2 are preferably dimensioned so that the gap or space between the inflator 5 and the airbag housing inner wall 9 is relatively narrow (compared with the overall cross-sectional area of housing 5) practically completely filled up. Thus only a single layer of airbag 3 fits through the gap, and the airbag is guided between the inflator 5 and the airbag housing inner wall 9 during inflation. If the housing 2 and the inflator 5 are both of circular, nearly circular, elliptical, or oval cross-sections, it may be seen that the gap therebetween is annular.

The compressed airbag 3 is thus arranged behind the inflator 5 in the rear part of the storage chamber 6 of the airbag housing 2. Thus, during inflation, the airbag is "pulled" forward in layers, as a result of the pressure produced, between the inflator 5 and the airbag housing inner wall 9. In this connection, the cover 4, as indicated, is opened and the airbag 3 may be unfolded and/or inflated in a targeted manner.

The cover 4 may be formed by a vehicle interior part, such as a surface portion of an instrument panel for concealed housing of the airbag housing, i.e. it is an "instrument panel airbag".

The airbag 3 may be fastened between the inflator 5 and the bolt 7, so that it is able to be unfolded to a considerable extent upwards, practically directly onto the opening on the cover 4.

The raised portion or strut 7 extends from the bottom of the airbag housing in the direction of the opening and/or cover 4, thus positioning the inflator 5 close to the cover 4 and/or the housing opening so that it may be easily reached. Additionally, a subdivision of the housing 2 into two chambers A, B is achieved (on opposing sides of the strut 7).

In contrast to the embodiment according to FIG. 1, in the device 10 according to FIG. 2 the cover 14 is constructed in two parts in the manner of a swing door, so that it does not have to be moved completely to the side, thus allowing the opening path of the cover 14 to be shorter.

Additionally, the embodiment of FIG. 2 has one or more through-holes 11 formed in housing 15 at a location remote from the cover 14, i.e. the bottom of the storage chamber 16. When folding/compressing the airbag 13, through holes 11 makes it possible to use a vacuum for the insertion thereof into the airbag housing 15, in order to "suck in" the airbag, (see arrows) so that a natural folded arrangement results.

In contrast to the embodiment according to FIGS. 1 and 2, in the device 20 according to FIG. 3 the airbag housing 21 and/or the wall 22 thereof of the airbag housing 21 are provided with compression zones 24, i.e. regions for energy conversion by material distortion, for example crumpling. In the event that the vehicle occupant potentially comes into contact with the airbag housing in the case of an accident, and/or could strike said airbag housing, it is expedient if the wall of the airbag housing comprises compression zones, i.e. regions for converting energy by material distortion, for example crumpling.

Additionally, airbag housing 21 may be formed to provide a narrowing 26 of the opening that is smaller than the cross-sectional area of the housing adjacent the opening 26. Such a narrow opening 26 may assist or contribute to a properly controlled unfolding and/or inflation of the airbag 25 during deployment.

In the simplest embodiment, the raised portion or strut is formed by a bolt. The bolt may also be used for fastening the airbag housing to a cross member 28 of the vehicle or other structural portion of the vehicle.

Thus the inflation of the airbag is simplified in comparison with conventional arrangements, as the entire airbag and/or the weight thereof no longer has to be forced out/ejected suddenly from the housing by the inflation unit which is generally located behind the airbag.

Additionally, the positioning of the inflation unit in the vicinity of the cover and/or the opening permits the compressed airbag to be positioned in a simple manner behind the inflation unit, without the airbag housing requiring larger dimensions. This is advantageous, in particular, when installing in the instrument panel.

In combination with the aforementioned feature, an advantageous arrangement of the compressed airbag behind the inflation unit in the rear part of the airbag housing is additionally produced, so that the construction of said airbag housing is more deep than wide While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An occupant protection device for a vehicle comprising:
   a housing having an opening and a closed end;
   a strut extending from the closed end toward the opening;
   an inflator supported by the strut adjacent the opening; and
   an airbag stored such that a majority of the airbag is between the inflator and the closed end, a layer of the airbag passing between the inflator and the opening.

2. The apparatus according to claim 1, wherein the inflator and an inner surface of the housing form a gap and the airbag passes through the gap.

3. The apparatus according to claim 1, further comprising a through-hole formed in the housing remote from the opening, the through-hole enabling application of a vacuum to interior of the housing.

4. The apparatus according to claim 1, wherein the housing has an elongated U-shaped cross-section.

5. The apparatus according to claim 1, further comprising a cover over the opening, the cover able to open to allow deployment of the airbag through the opening.

6. The apparatus according to claim 5, wherein the cover is formed by a vehicle internal component for concealment of the airbag housing.

7. The apparatus according to claim 1, wherein the housing comprises a compression zone to allow deformation of the housing under an impact.

8. The apparatus according to claim 1, wherein the opening is formed by a narrowing of the housing adjacent to the opening.

9. The apparatus according to claim 1, wherein the strut comprises a bolt.

10. An occupant protection device for a vehicle comprising:
    a housing having an opening and a closed end;
    a strut secured to the housing adjacent the closed end and extending from the closed end toward the opening;
    an inflator supported by the strut adjacent the opening and spaced from the closed end to form a storage chamber between the inflator and the closed end of the housing, the inflator spaced from an inner wall of the housing to form a gap therebetween; and
    an airbag that, when in a deflated condition, is disposed primarily in the storage chamber, a layer of the airbag passing through the gap and around a surface of the inflator immediately adjacent the opening.

11. The apparatus according to claim 10, further comprising a through-hole formed in the housing remote from the opening, the through-hole enabling application of a vacuum to the storage chamber.

12. The apparatus according to claim 10, wherein the housing has an elongated U-shaped cross-section.

13. The apparatus according to claim 10, further comprising a cover over the opening, the cover able to open to allow deployment of the airbag through the opening.

14. The apparatus according to claim 13, wherein the cover is formed by a vehicle internal component for concealment of the airbag housing.

15. The apparatus according to claim 10, wherein the housing comprises a compression zone to allow deformation of the housing under an impact.

16. The apparatus according to claim 10, wherein the opening is formed by a narrowing of the housing adjacent to the opening.

17. An occupant protection device for a vehicle comprising:
- a housing defining an interior chamber and having an opening;
- a strut secured to a closed end of the housing opposite the opening and extending toward the opening;
- an inflator supported by the strut within the chamber and adjacent the opening, the inflator spaced from an inner wall of the housing to form a gap therebetween; and
- an airbag that, when in a deflated condition, is stored such that a majority of the airbag is in the chamber between the inflator and the closed end of the housing, and a layer of the airbag passes through the gap and over a surface of the inflator immediately adjacent the opening.

18. The apparatus according to claim 17, further comprising a through-hole formed in the housing remote from the opening, the through-hole enabling application of a vacuum to the chamber.

19. The apparatus according to claim 17, wherein the housing comprises a compression zone to allow deformation of the housing under an impact.

20. The apparatus according to claim 17, wherein the opening is formed by a narrowing of the housing adjacent to the opening.

* * * * *